United States Patent [19]

Ishizaka et al.

[11] Patent Number: 4,550,991
[45] Date of Patent: Nov. 5, 1985

[54] DEVICE FOR DETECTING CODE ON FILM CARTRIDGE

[75] Inventors: Sunao Ishizaka; Osamu Maida, both of Tokyo, Japan

[73] Assignee: Nippon Kogaku K.K., Tokyo, Japan

[21] Appl. No.: 675,310

[22] Filed: Nov. 27, 1984

[30] Foreign Application Priority Data

Dec. 2, 1983 [JP] Japan .............................. 58-186808[U]

[51] Int. Cl.⁴ ............................................... G03B 7/24
[52] U.S. Cl. ........................................................ 354/21
[58] Field of Search ......................... 354/21; 352/78 C

[56] References Cited

U.S. PATENT DOCUMENTS

| | | | |
|---|---|---|---|
| 4,200,371 | 4/1980 | Suzuki et al. | 354/21 |
| 4,431,283 | 2/1984 | Hoda et al. | 354/21 |
| 4,500,183 | 2/1985 | Tanikawa | 354/21 |

Primary Examiner—William B. Perkey
Attorney, Agent, or Firm—Fitzpatrick, Cella, Harper & Scinto

[57] ABSTRACT

A camera is provided with a detecting means provided with detecting contacts capable of positively detecting an information code on a film cartridge loaded in a film chamber and so arranged that they will not adversely affect the stability of the film cartridge loaded in the film chamber.

2 Claims, 4 Drawing Figures

DEVICE FOR DETECTING CODE ON FILM CARTRIDGE

BACKGROUND OF THE INVENTION

1. Field of the Invention

The present invention relates to an information detecting device for a camera of the type using a film cartridge with a code pattern representative of information of a film encased within the film cartridge.

2. Description of the Prior Art

In photography, it been well known that a film magazine, cassette or cartridge is provided with coding representative of inherent information such as a film speed, etc. of a film encased in the film magazine, cassette or cartridge and that a camera is provided with a detecting device for reading out said film information. Said film information derived by the detecting device is automatically stored in the camera and used to represent an exposure data or to control exposures.

For instance, U.S. Pat. No. 4,173,401 discloses a camera provided with a film cartridge with a series of laterally spaced electrically conductive contacts and detection means with a series of laterally spaced electrical contact pins which correspond to a series of laterally spaced electrically conductive contacts, respectively, on the film cartridge. Some of the contacts on the film cartridge are coated with an electrically insulating cover so that they are electrically disconnected from the corresponding contact pins. Therefore, an electrically conductive and electrically non-conductive pattern is formed and represents a digital code representative of the film information.

The information picked up by these contact pins is applied to an electric circuit within the camera, decoded and stored.

The contact pins are retractably extended through the surrounding walls of a film chamber in the camera, which chamber houses a film cartridge, in such a way that the contact pins are brought into contact with the contacts on the film cartridge. In order to ensure positive contact between the contact pins and the contacts on the film cartridge, springs are provided so that the contact pins are normally biased to extend into the film chamber.

In order to ensure the smooth loading or removal of a film cartridge into or away from the film chamber, it is preferable that the contact pins are extended at the bottom of the film chamber rather than at the positions adjacent to the opening through which a film cartridge is loaded or removed. In the latter case, the contact pins are biased toward the opening of the film chamber.

When a camera back is opened to expose the film chamber of the type described and when a film cartridge is loaded, the film cartridge is pushed back by the contact pins biased under the forces of the springs so that it cannot be loaded at a predetermined position within the film chamber. Therefore, there has been a defect that it is difficult to withdraw a film from the film cartridge under these conditions and to engage it with a spool of the camera.

SUMMARY OF THE INVENTION

In view of the above, the present invention has for its object to provide a camera which is provided with a detecting means provided with detecting contacts capable of positively detecting an information code on a film cartridge loaded in a film chamber and so arranged that they will not adversely affect the stability of the film cartridge loaded in the film chamber.

According to one aspect of the present invention, the detecting means are so designed and arranged that when the camera back is closed, the detecting contacts are extended into the film chamber, but when the camera back is opened, they are retracted away from the film chamber, whereby they exert no pressure against the film cartridge.

According to another aspect of the present invention, magnets are disposed in the film chamber wall adjacent to each detecting contact so biased as to be extended into the film chamber. As a consequence, the film cartridge loaded into the film chamber is attracted by the magnets so that it can be securely held in the film chamber, pressing against the detecting contacts.

The above and other objects, effects, features and advantages of the present invention will become more apparent from the following description of preferred embodiments thereof taken in conjunction with the accompanying drawings.

DESCRIPTION OF THE PREFERRED EMBODIMENTS

Figure 1:
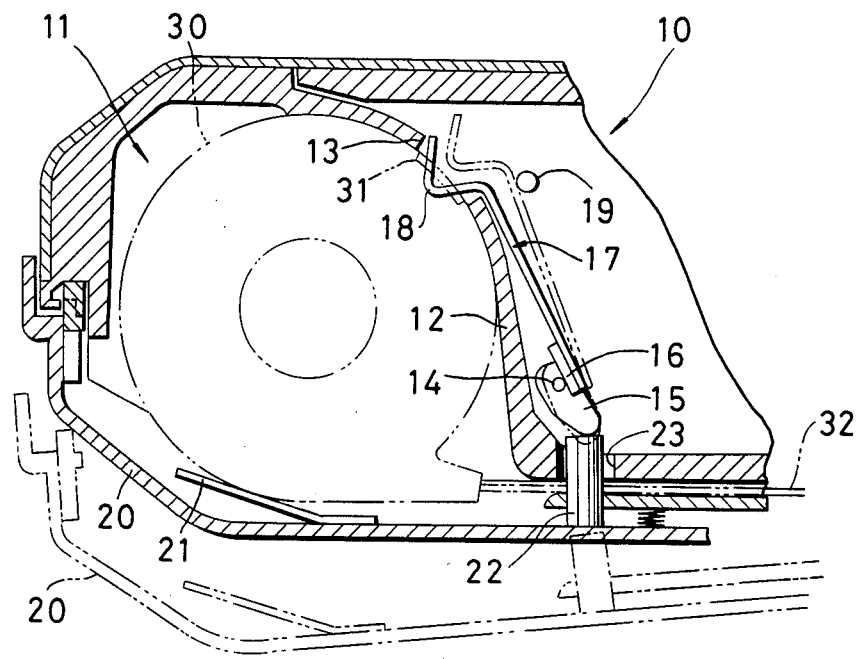
FIG. 1 is a sectional view of a film chamber and a code detecting device of a camera in accordance with a first embodiment of the present invention.
Figure 2:
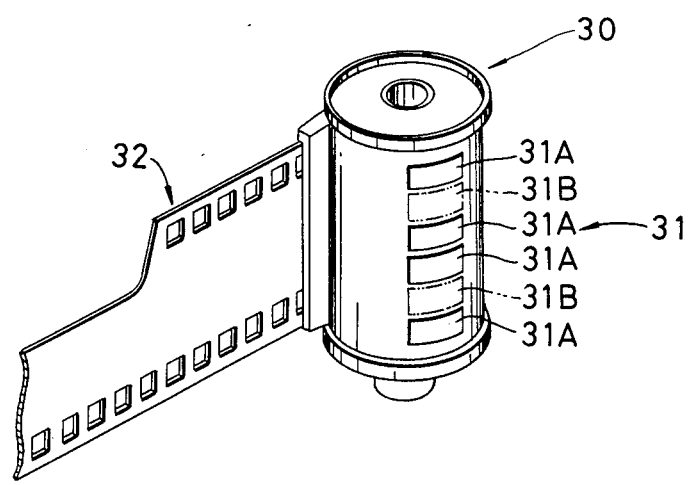
FIG. 2 is a perspective view of a coded film cartridge.

FIG. 1 shows part of a film chamber of a camera 10 in accordance with a first embodiment of the present invention. A film cartridge 30 as indicated by imaginary lines in FIG. 2 is housed within the film chamber 11.

A straight array of contacts 31 are arranged on the cylindrical surface of a film cartridge 31. The contacts 31 are divided into electrically conductive surfaces 31A formed by partially removing the paint or the like coated on the metallic cartridge 30 and electrically non-conductive surfaces 31B which are indicated by broken lines and are coated with an electrically insulating cover. The combinations of electrically conductive surfaces 31A and electrically non-conductive surfaces 31B can represent six-bit digital code indicia.

These digital codes represent various film information such as a film speed of a film 32, the number of exposures and latitude.

Figure 3:
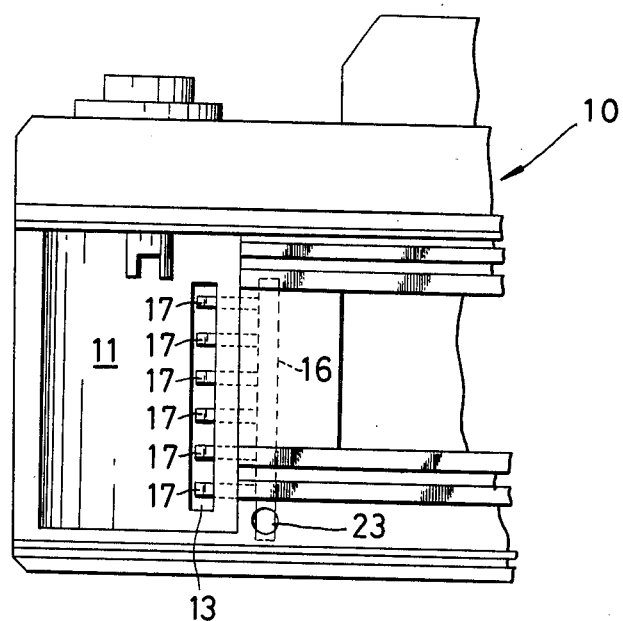
FIG. 3 is a bottom view of the camera shown in FIG. 1 illustrating a camera back thereof being opened.
Figure 4:
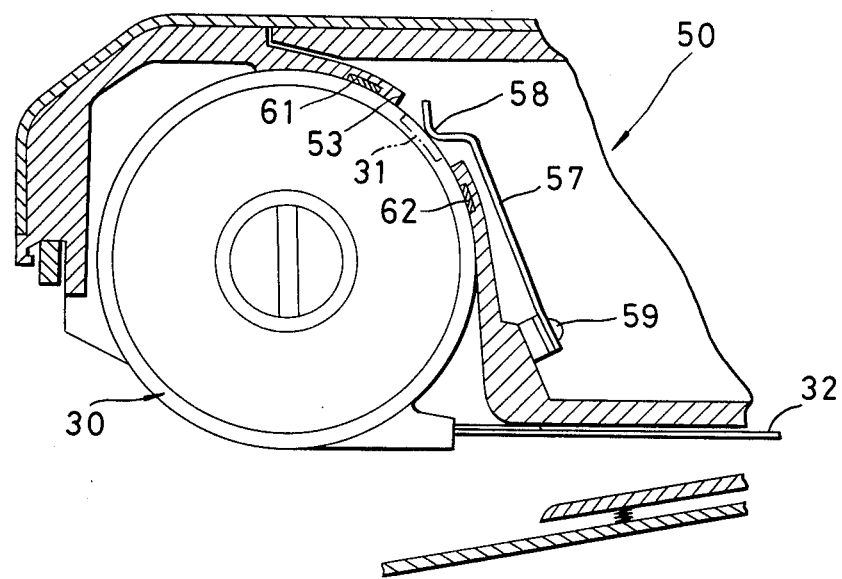
FIG. 4 is a sectional view of a film chamber and a code detecting device of a camera in accordance with a second embodiment of the present invention.

The wall 12 of the film chamber 11 is formed with slits 13 in opposed relationship with the digital code indicia on the cartridge 30. An eccentric rod 15 which is rotatable about a fixed pin 14 in parallel with the axis of the film cartridge 30 is disposed on the opposite side of the film chamber wall 12. A flexible printed circuit board 16 is securely attached to the eccentric rod 15 and, as best shown in FIG. 3, has six electrically conductive leaf springs 17 securely fixed thereon.

The leading end of each leaf spring 17 terminates into a contact 18 which extends into the film chamber 11 through the slit 13 of the film chamber wall 12. The leaf spring 17 is displaced by the rotation of the rod 15 between a first position at which the contact 18 is extended into the film chamber 11 as indicated by the solid lines in FIG. 1 and a second position at which the contact 18 is retracted away from the film chamber 11 and held in position by means of a stopper 19 as indicated by the broken lines as also shown in FIG. 1.

A camera back 20 which normally closes the film chamber 11 may be rotated about a hinge (not show) and opened as indicated by the broken lines. The camera back 20 has an engaging mechanism at the left side and leaf spring 21 which is adapted to press against the film cartridge 30 when the camera back 20 is closed.

The camera back 20 further has a push rod 22 which is extended inwardly and whose upper end is extended through a hole 23 formed through a wall at the rear of the camera so as to engage with the rod 15 when the camera back 20 is closed. When the eccentric rod 15 is pushed by the push rod 22, it is caused to rotate in the counterclockwise direction and held in the position indicated by the solid lines in FIG. 1.

When the camera back 20 is opened in order to load a film cartridge, the push rod 22 is moved away from the eccentric rod 15 so that the leaf springs 17 whose contacts 18 have been extended into the film chamber 11 are released. Under these conditions, therefore, even when a film cartridge 30 is loaded into the film chamber 11, the leaf springs 17 exert no pressure through their contacts 18 to the film cartridge 30. As a consequence, the film cartridge 30 is securely held in a predetermined position.

When the camera back 20 is closed, the leaf springs 17 have their contacts 18 pressed against the contacts 31 on the film cartridge 30. At the same time, the leaf spring 21 of the camera back 20 also is pressed against the film cartridge 30. As a result, positive engagement between the contacts 18 and the contacts 31 on the film cartridge 30 is ensured and the digital code on the film cartridge 30 is therefore transmitted to a read circuit (not shown) through the leaf springs 17 and the flexible printed circuit board 16.

In a camera 50 in accordance with a second embodiment of the present invention, one end of a leaf spring 57, which is electrically conductive, is securely fixed to a stationary wall with a screw 59 in such a way that a contact 58 formed at the other end of the leaf spring 57 is normally extended into the film chamber through a hole 53. Permanent magnets 61 and 62 are embedded in the film chamber wall adjacent this hole 53 and are oriented toward the film chamber.

In general, the film cartridges are made of steel or the like so that when a film cartridge 30 is loaded into the film chamber, it is attracted by the permanent magnets 61 and 62. As a consequence, the film cartridge 30 presses the contacts 58 against the forces of the leaf springs 57 and is securely held in position in the film chamber.

What is claimed is:

1. In a camera of the type capable of using a film cartridge having a code indicia including a plurality of electrically conductive contacts representative of one or more features of a film encased in said film cartridge, a code indicia detecting device comprising:
   (a) wall members which define a film chamber for receiving therein said film cartridge and which are formed with openings which are in opposed relationship with said code indicia on said film cartridge;
   (b) detection means which has electrical contact means which in turn can be moved between first positions at which said electrical contact means are extended into said film chamber through said openings of said wall members and second positions at which said electrical contact means are retracted away from said film chamber, said detection means being capable of deriving an electrical signal from said code indicia through said electrical contact means;
   (c) a back member which opens or closes said film chamber; and
   (d) means for operatively connecting said detection means to said back member in such a way that when said back member closes said film chamber, said electrical contact means are forced into their first positions.

2. In a camera of the type capable of using a film cartridge having a code indicia including a plurality of electrically conductive contacts representative of one or more features of a film encased in said film cartridge, a code indicia detecting device comprising:
   (a) wall members which define a film chamber for receiving therein said film cartridge and which are formed with openings which are in opposed relationship with said code indicia on said film cartridge;
   (b) detection means which has electrical contact means which in turn can be moved between first positions at which said electrical contact means are extended into said film chamber through said openings of said wall members and second positions at which said electrical contact means are retracted away from said film chamber, said detection means being capable of deriving an electrical signal from said code indicia through said electrical contact means, said electrical contact means being normally biased toward said first positions; and
   (c) permanent magnet members embedded in one of said wall members adjacent to respective openings thereof and oriented toward said film chamber.

\* \* \* \* \*